INVENTOR
WILHELMUS H. L. CLAESSEN
BY Frank R. Trifari
AGENT

United States Patent Office 3,154,696

Patented Oct. 27, 1964

3,154,696

CIRCUITS FOR TRANSMITTING INPUT PULSES OF ANY POLARITY AS OUTPUT PULSES HAVING A GIVEN CONSTANT POLARITY

Wilhelmus Hubertus Louis Claessen, Eindhoven, Netherlands, assignor to North American Philips Company, Inc., New York, N.Y., a corporation of Delaware Filed Feb. 26, 1962, Ser. No. 175,537
Claims priority, application Germany Mar. 20, 1961
4 Claims. (Cl. 307—88.5)

Figure 1:
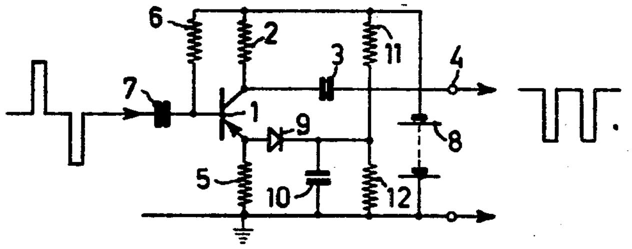

This invention relates to a circuit for the transmission of electrical pulses of any polarity, the circuit including a transistor coupled in grounded-emitter connection to a load resistor in the collector-circuit and an output terminal coupled to said collector. Such circuit arrangements have long been known, especially for use as pulse amplifiers.

A primary object of the invention is to provide an arrangement of the above kind which permits electrical input impulses of any polarity to be transferred as output pulses of a given constant polarity. Such arrangements may advantageously be used, for example, in counters and/or computers, wherein pulses from different sources are to be handled by a common device.

According to one aspect of the invention, the emitter of the transistor is coupled to ground through a resistor, and a forward current is supplied to the base of the transistor with a value such that the transistor operates below the bend of its collector current-collector voltage characteristic. If, under these conditions, a pulse of sufficient amplitude is applied in the cut off direction to the base of the transistor, the voltage of its collector increases with respect to ground, due to a displacement of the operating-point of the transistor above the bend of its collector current-collector voltage characteristic. If, however, a pulse is applied in the forward direction to the base of the transistor, the collector voltage likewise increases, this occurring by the corresponding increase of the voltage drop set up across the emitter resistor by the emitter current.

Stated differently, the invention is based on recognition of the fact that a transistor operated in grounded-emitter connection below the bend of its collector current-collector voltage characteristic behaves, when a resistor is connected in its emitter-circuit, and when forward-directed pulses are applied to its base, as a direct connection between the input terminal (base) and the output terminal (collector), these terminals being connected to the tap of a voltage divider including the collector and emitter resistors. To ensure only a minimum attenuation of the forward-directed pulses, the emitter resistor is preferably chosen to have a high value relative to the base-emitter forward resistance of the transistor; if the source of forward-directed pulses is to be loaded to the least possible extent, an emitter resistor of approximately the same value as that of the collector resistor is used for a given total load resistance between the emitter and the collector.

The emitter resistor counteracts an amplification of the pulses applied in the cut off direction because a strong negative feed-back occurs in the emitter circuit. For completely cutting off the transistor, the cut-off pulses must therefore have an amplitude at least equal to the voltage across the emitter resistor in the absence of an input pulse. Voltage amplification of the pulses applied in the forward direction cannot be obtained with the arrangement according to the invention. If, however, it is desired to amplify the pulses applied in the cut-off direction, the occurrence of any appreciable negative feedback in the emitter circuit of the transistor may be avoided by bridging the emitter resistor by the series-combination of a diode connected in the cut off direction and of a voltage source polarizing the diode in the forward direction. The voltage of this source should be approximately equal to the voltage drop across the emitter resistor in the absence of an input pulse. When a pulse is applied in the cut-off direction to the base of the transistor, the diode becomes conducting; therefore, the voltage across the emitter resistor cannot decrease below that of the voltage source polarizing the diode and any appreciable negative feedback in the emitter circuit of the transistor is prevented. However, the diode remains cut off and inoperative when a pulse is applied in the forward direction.

Figure 2:
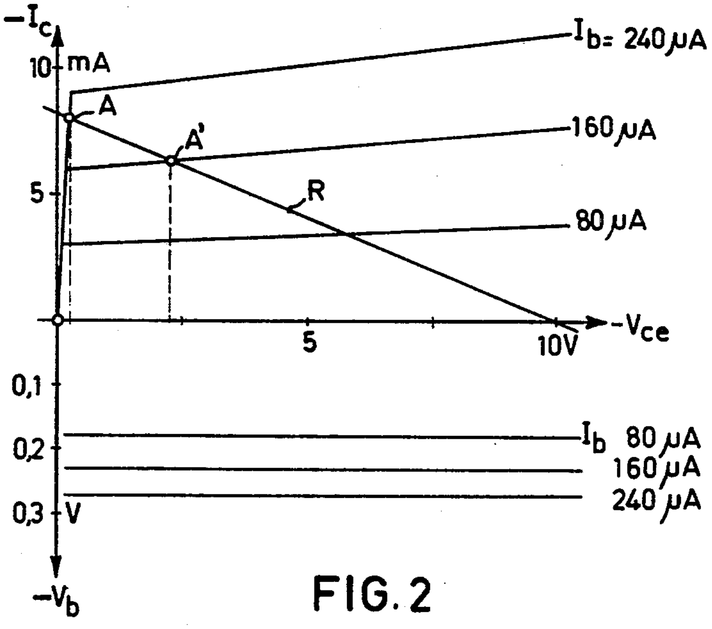

In order that the invention may be readily carried into effect, it will now be described in detail, by way of example, with reference to the accompanying diagrammatic drawing, in which:

FIGURE 1 shows the circuit diagram of one embodiment of an arrangement according to the invention, and FIGURE 2 shows characteristic curves of a transistor for use in this embodiment.

The arrangement shown in FIGURE 1 comprises a transistor 1 connected in grounded-emitter connection and the collector of which is connected through a load resistor 2 to the negative terminal of a supply voltage source and through a coupling capacitor 3 to an output terminal 4. The load resistor 2 may have a value of 6 kilohms and the source 8 a value of 10 volts. The base of transistor 1, for example a p-n-p-junction transistor as shown receives a forward-directed polarizing current through a resistor 6 which may have a value of 20K ohms and is connected to an input terminal through a coupling capacitor 7. The emitter of the transistor is coupled to ground through a resistor 5 while electrical pulses of any polarity which are to be transmitted are supplied to the arrangement between the input terminal and ground, as shown.

According to the invention, a forward current is supplied to the base of transistor 1 via resistor 6, said forward current having a value such that the transistor operates below the bend of its collector current-collector voltage characteristic shown in FIGURE 2. Under these conditions, and if a pulse of positive polarity, i.e., a pulse directed in the cut-off direction, is applied to the base of the transistor, the voltage of its collector decreases with respect to ground since the operating point, located for example at point A (FIGURE 2), is displaced along the straight load line R to point A′ which is located on a characteristic corresponding to a lower base current $I_b$. In fact, it can be seen from FIG. 2 that the new operating point A′ lies above the bend of the second collector current-collector voltage characteristic. If, however, a forward-directed pulse (a negative pulse in the case of a p-n-p transistor) is applied to the base of transistor 1, the collector voltage of the transistor decreases likewise with respect to ground due to the corresponding increase in the voltage drop set up across the emitter resistor 5 by the emitter current. Consequently, electrical input pulses of any polarity applied to the base of transistor 1 via capacitor 7 are transmitted to the output terminal 4 through coupling capacitor 3, as output pulses of a given constant polarity. With regard to the forward-directed or negative pulses, this is due to the fact that, in the presence of an emitter resistor and upon supplying a forward current to the base of transistor 1 such that the transistor operates below the bend of its collector current-collector voltage characteristic, the transistor behaves as a direct connection between its base or the input terminal and its collector or the output terminal 4. The conditions may be imagined as if said terminal were connected directly to the tap of a voltage divider comprising collector resistor 2 and emitter resistor 5.

This voltage divider 2, 5 constitutes, of course, a load for the source of input pulses, especially for the forward-directed or negative pulses. If the internal resistance of the pulse source is not very low, the forward-directed pulses are correspondingly attenuated. To minimize such attenuation as much as possible, the emitter resistor 5 is chosen to have a high value with respect to the base emitter forward resistance; to ensure at the same time a minimum damping of the pulse source, the emitter resistor 5 is chosen to have a value approximately equal to that of the collector resistor 2, for a given load resistance 2, 5 between the emitter and the collector.

The emitter resistor 5 counteracts any amplification of the input pulses applied in the cut-off direction since a strong negative feedback occurs in the emitter resistor. For completely cutting off the transistor 1, said pulses must therefore have an amplitude at least equal to the voltage set up across the emitter resistor 5 in the absence of an input pulse or in the no-load condition.

Voltage amplification of the input pulses applied in the forward direction cannot, however, be obtained with the arrangement described. It may be desirable, however, to amplify at least the input pulses applied in the cut-off direction. To permit this, it is necessary to prevent the occurrence of any appreciable negative feedback coupling in the emitter resistor 5 and with respect to input pulses applied in the cut-off direction. For this purpose the emitter resistor is bridged by the series-combination of a diode 9 connected in the cut-off direction and a voltage source polarizing the diode 9 in the forward direction. This voltage source comprises, in this example, a voltage divider having two resistors 11 and 12 of, for example, 50 and 35K ohms respectively, connected in parallel with the supply voltage source 8, the tap of the voltage divider being connected to the electrode (cathode) of the diode 9 remote from the emitter of transistor 1 and bypassed with respect to ground by means of a capacitor 10. The voltage across capacitor 10 is approximately equal to the voltage drop set up across emitter resistor 5 in the absence of an input pulse or in the no-load condition, i.e., approximately equal to half the voltage of the supply source 8.

The diode 9 becomes conducting upon applying a pulse in the cut-off direction to the base of transistor 1, so that the voltage across emitter resistor 5 cannot become lower than the voltage of the voltage source 10–12 polarizing the diode 9. Under these conditions, no appreciable negative feedback occurs in the emitter resistor 5. A very small voltage applied in the cut-off direction (0.27 volt, FIGURE 2) is sufficient for completely cutting off transistor 1 and thus bringing the potential of its collector to that of the negative terminal of source 8, for example to −10 volts. The amplification of the input pulses applied in the cut off direction and having a minimum amplitude of 0.27 is thus $$\frac{10-5}{0.27}=18.5 \text{ times}$$

The diode 9 is however cut off by the voltage drop across emitter resistor 5, or its cut-off voltage is increased upon applying a forward-directed input pulse. In no case does it become conducting and it thus remains inoperative, so that said pulse reaches the output terminal 4 with unchanged amplitude, except for the attenuation and/or damping brought about by the emitter and collector resistors.

It is evident that similar arrangements may be built up with other kinds of transistors, more particularly with n-p-n-junction transistors; when using n-p-n transistors, of course, the various corresponding polarities are reversed. Also, all quantitative values given are for illustrative purposes only.

It is also possible for the described arrangement to be followed by a further transistor stage whose transistor is conducting, for example saturated, or cut off in the rest condition, and is completely cut off or rendered conducting by any pulse occurring at the output terminal 4. Pulses of a given constant polarity and of constant amplitude are thus obtained at the output of this second stage.

While the invention has been described with respect to a specific embodiment, it will be evident to those skilled in the art that many modifications thereof are possible without departing from the inventive concept, the scope of which is set forth in the appended claims.

What is claimed is:

1. A circuit for transmitting electrical pulses of any polarity as pulses of one polarity, comprising: a transistor connected in grounded-emitter connection, a load resistor connected in the collector-circuit of said transistor, an output terminal coupled to said collector, the emitter of the transistor being coupled to ground through a resistor, means for supplying to the base of the transistor a forward current having a value such that the transistor operates below the bend of its collector current-collector voltage characteristic, means for applying input pulses having forward and cut-off polarities to the base of the transistor, a pulse of sufficient amplitude having the cut-off polarity causing the voltage drop across said collector resistor to increase in a predetermined direction due to a displacement of the operating-point of the transistor to a point above the bend of its collector current-collector voltage characteristic, and a pulse having the forward polarity also causing the voltage drop across said collector resistor to increase in the same predetermined direction in response to a corresponding change of the voltage drop across the emitter resistor due to the flow of emitter current, said emitter resistor being bridged by the series-combination of a diode connected in the cut-off direction of the transistor and a voltage source having a polarity to polarize said diode in the pass direction, the voltage of said source being substantially equal to the voltage drop occurring across the emitter resistor in the absence of an input pulse, whereby input pulses of any polarity produce like voltage drops across said collector resistor and output pulses of one polarity at said output terminal and said diode becomes conducting upon the application of a pulse having the cut-off polarity and prevents the occurrence of any appreciable feedback in the emitter circuit of the transistor.

2. A circuit as claimed in claim 1, wherein said emitter resistor has a high value relative to the base-emitter resistance of the transistor.

3. A circuit as claimed in claim 1, wherein said emitter resistor has a value substantially equal to that of the load resistor.

4. A circuit as claimed in claim 2, wherein said emitter resistor has a value substantially equal to that of the load resistor.

References Cited in the file of this patent

UNITED STATES PATENTS

| | | |
|---|---|---|
| 3,068,424 | Orloff et al. | Dec. 11, 1962 |
| 3,098,936 | Isabeau | July 23, 1963 |